United States Patent
Krooss

(10) Patent No.: US 6,241,449 B1
(45) Date of Patent: Jun. 5, 2001

(54) APPARATUS AND METHOD FOR UNLOADING PLASTIC CONTAINERS STORED IN STACKS OF TIERS

(76) Inventor: Robert J. Krooss, 105 Lake Dr., Mountain Lakes, NJ (US) 07046

(*) Notice: Subject to any disclaimer, the term of this patent is extended or adjusted under 35 U.S.C. 154(b) by 0 days.

(21) Appl. No.: 09/250,924

(22) Filed: Feb. 16, 1999

(51) Int. Cl.$^7$ .................................................. B65B 21/16
(52) U.S. Cl. ........................ 414/419; 414/778; 414/796.2
(58) Field of Search .............................. 414/796.7, 796.5, 414/922, 795.9, 796.2, 778, 404, 419

(56) References Cited

U.S. PATENT DOCUMENTS

| | | |
|---|---|---|
| 1,898,393 | 2/1933 | Rickers . |
| 1,907,457 * | 5/1933 | Stevenson ........................ 414/796.7 |
| 2,543,578 | 2/1951 | Hutaff . |
| 2,993,609 * | 7/1961 | Enterline et al. .................... 414/922 |
| 3,327,872 | 6/1967 | Madden . |
| 3,401,811 * | 9/1968 | Grasvoll ............................ 414/796.7 |
| 3,490,630 | 1/1970 | Sullivan . |
| 3,543,949 | 12/1970 | Weier . |
| 3,616,951 | 11/1971 | Clari et al. . |
| 3,724,686 | 4/1973 | Nelson . |
| 3,753,509 | 8/1973 | Kock . |
| 3,817,405 * | 6/1974 | Neely, Jr. ........................... 414/796.5 |
| 4,037,734 | 7/1977 | Erdman . |
| 4,106,635 | 8/1978 | Nishimura . |
| 4,231,697 | 11/1980 | Franz . |
| 4,493,599 | 1/1985 | Hartness et al. . |
| 4,527,940 | 7/1985 | Biery . |
| 4,561,817 | 12/1985 | Spletzer et al. . |
| 4,681,209 | 7/1987 | Marti . |
| 4,921,388 * | 5/1990 | Nelson .............................. 414/795.9 |
| 4,988,263 | 1/1991 | Odenthal . |
| 5,033,929 | 7/1991 | Marti . |
| 5,161,934 | 11/1992 | Richardson . |
| 5,244,330 | 9/1993 | Tonjes . |
| 5,249,915 | 10/1993 | Ritola . |
| 5,415,322 | 5/1995 | Sala . |
| 5,451,136 | 9/1995 | Easton . |
| 5,607,282 | 3/1997 | Brannen et al. . |
| 5,619,246 * | 4/1997 | Straayer et al. ..................... 347/262 |
| 5,788,461 | 8/1998 | Easton et al. . |

* cited by examiner

Primary Examiner—Joseph A. Fischetti
(74) Attorney, Agent, or Firm—Stephen E. Feldman, P.C.

(57) ABSTRACT

A receiving frame, mounted on a horizontal platform includes a sub-frame that is tiltable, with respect to the platform, and has an elevator and elevator platform on its rear wall. The receiving frame receives a stack of tiers of plastic containers on a pallet. The pallet is positioned on the elevator platform. The sub-frame tilts 30 degrees off the vertical, out the open back of the receiving frame. A cover and tier sheet gripping device is provided, located above the top of the sub-frame, for securing and removing the top cover and tier sheets from the stack of tiers on the pallet, on the elevator platform. With the sub-frame tilted at 30 degrees off vertical, the elevator incrementally lifts its platform so that the base of the containers in the top tier and adjacent the rear wall of the sub-frame are at level with the top of the rear wall. The sheet gripping device secures and removes the top cover or tier sheet on the stack, freeing the containers in the top tier of the stack to slide along the inclined tier sheet and free-fall off the stack, over the wall. The process is repeated until the pallet has been unloaded. The accumulated, secured cover and tier sheets are returned to the pallet. The pallet is lowered and the sub-frame is returned to the vertical.

9 Claims, 4 Drawing Sheets

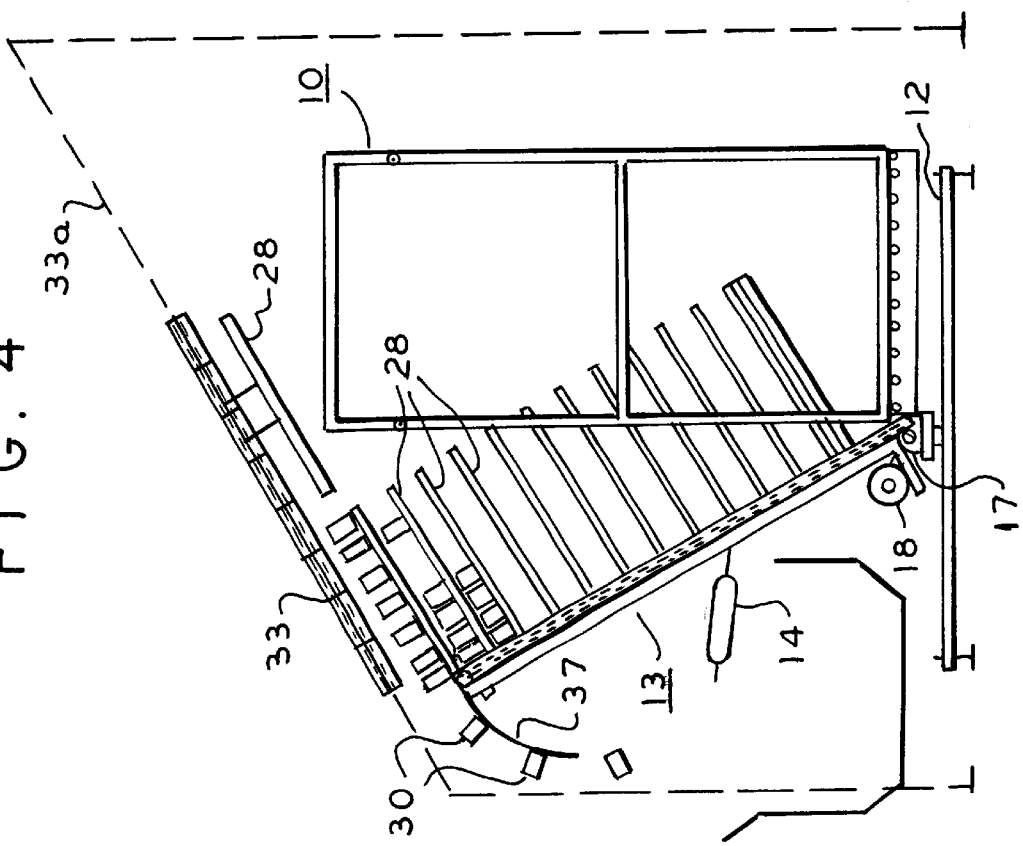
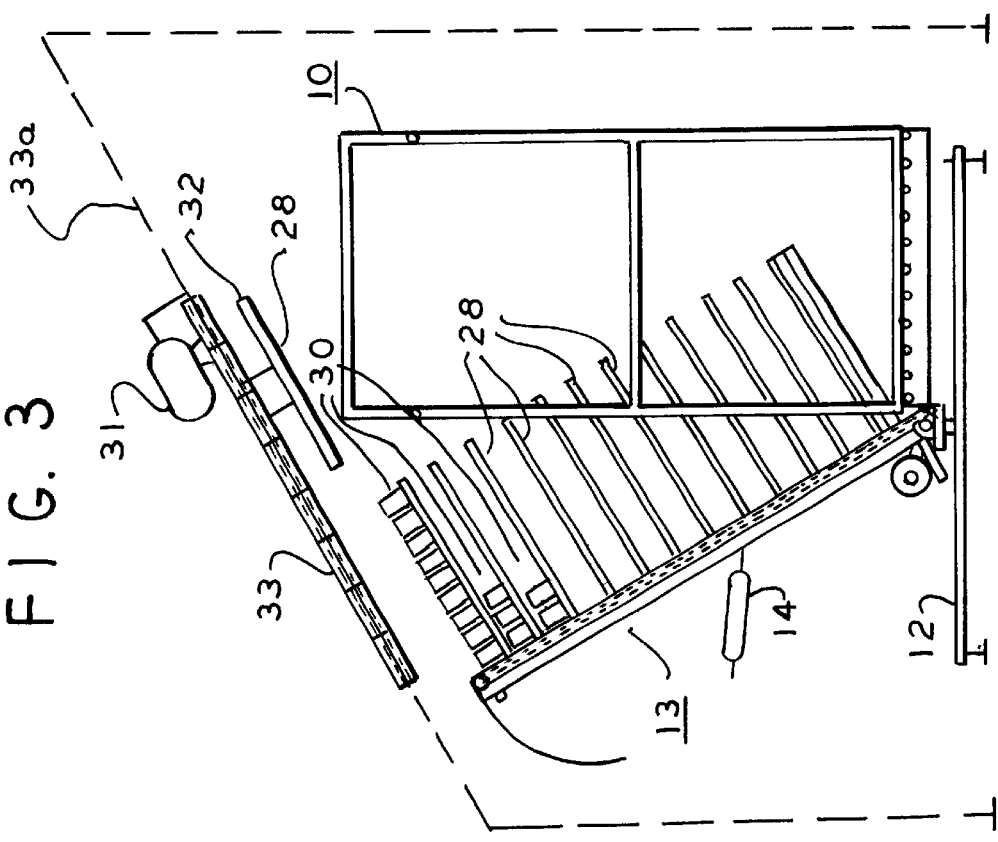

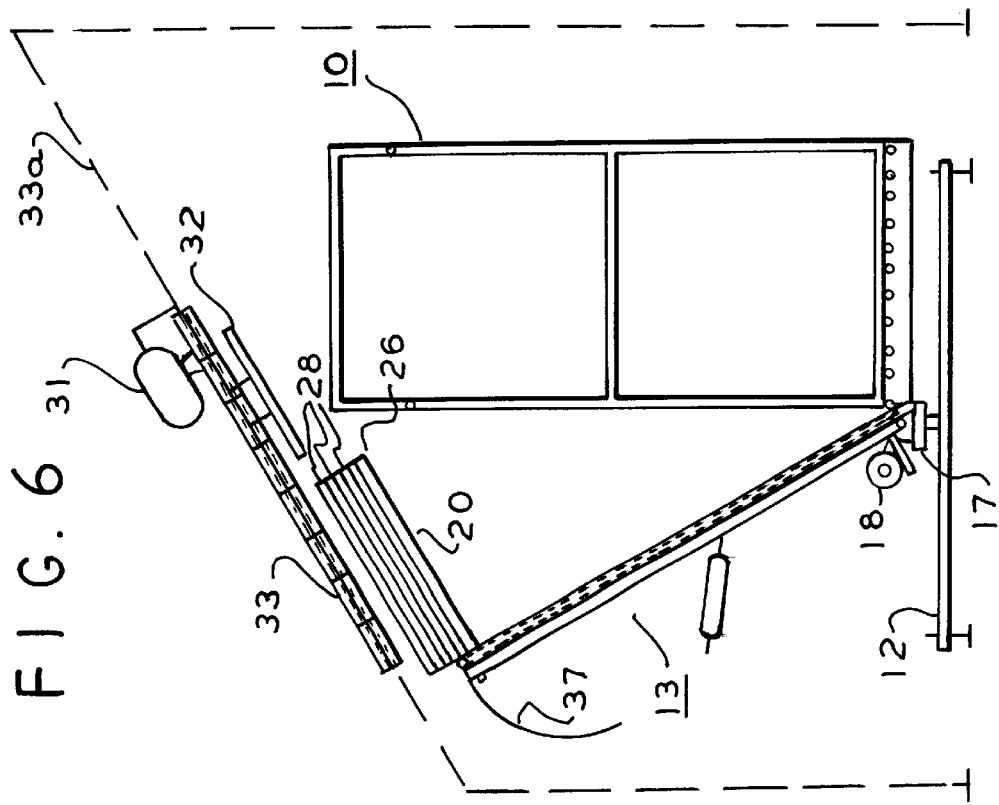
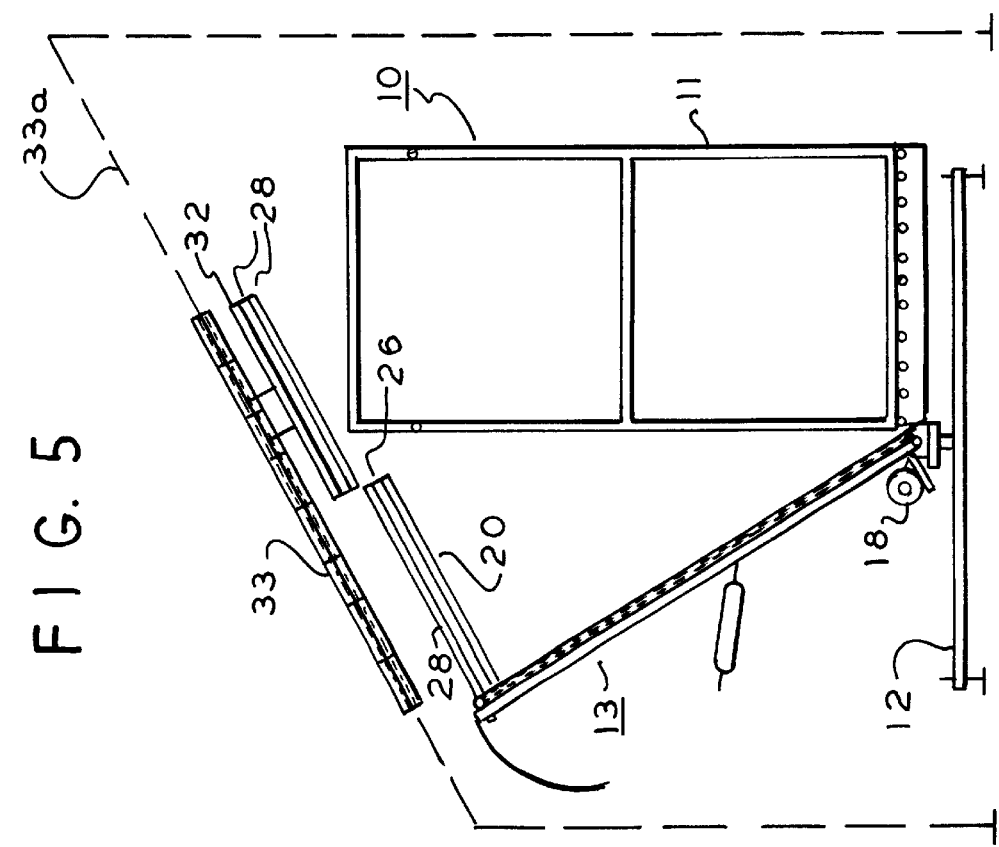

APPARATUS AND METHOD FOR UNLOADING PLASTIC CONTAINERS STORED IN STACKS OF TIERS

The applicant of this application is a co-applicant of co-pending application Ser. No. 09/245,115 filed Jan. 25, 1999 and entitled "Pallet Unloading Apparatus and Method".

BACKGROUND OF THE INVENTION

1. Field of the Invention

The present invention relates to apparatus and methods for unloading plastic bottles and/or jars or containers, stored in stacks of tiers on a movable pallet.

2. Prior Art

Glass bottles and/or jars, or glass containers, have long been used in commercial packaging for merchandise of all kind. Plastic bottles and/or jars, or plastic containers, more recently serve substantially the same purpose as corresponding glass containers and appear to be preferred over glass containers in the commercial market. Plastic containers are less expensive to manufacture than corresponding glass containers. Plastic containers are less fragile than corresponding glass containers although most glass containers are more scratch resistant than most plastic containers. Plastic however, weighs substantially less than corresponding glass, making plastic containers lighter in weight than corresponding glass containers.

Plastic containers are usually manufactured in large volume and are stored in hoppers, bins or stacks of tiers. When plastic containers are stored in stacks of tiers, the stack of tiers of plastic containers is usually supported on a pallet, making the stack of tiers of plastic containers conveniently movable, using a fork-lift apparatus, for example.

A stack of tiers of plastic containers usually consists of a support means such as a support sheet or tier sheet, on which a quantity of plastic containers are aligned, utilizing the upper surface of the support sheet or tier sheet. Depending on the size of the plastic container, a tier of plastic containers may include as many as 200 to 300 plastic containers. Each tier, in a stack of tiers, may include a support sheet or tier sheet supporting or retaining a plurality of plastic containers, aligned on the support sheet. There may be as few as eight (8) tiers and as many as twenty (20) tiers, in a stack of tiers, depending on the size, in the height, of the container and the height of the stack. The stacking or cascading of a relatively large number of tiers, one on top of the other, on a pallet, makes a relatively unstable stack. However, a pallet and the stack of tiers of plastic containers held on the pallet are potentially highly movable and conveniently storable. In order to provide a more stable load on a pallet, the stack of tiers may be secured to the pallet by straps or bands. The straps may extend longitudinally about and over the stack of tiers and secure the stack of tiers of plastic containers to the pallet. The straps used to secure the stack of tiers to the pallet may be secured to or extended about the pallet supporting the stack of tiers. The use of straps or bands for securing a stack of tiers to a pallet may require a cover or support sheet covering the top tier in the stack of tiers. With the stack of tiers secured to the supporting pallet, the stack of tiers is more stable and may be more easily moved horizontally or vertically. Another stack stabilizing process is to cover the stack with a sheet, such as a plastic sheet, for example. A sheeting cover will stabilize the load on the pallet and also cover the stack, keeping the contents clean.

Empty plastic containers having essentially identical physical characteristics are usually stored in mass, such as in bins or in hoppers, or in stacks of tiers on a platform or pallet, for example. Stacks of tiers of plastic containers are easily and readably stored and easily moved. However, the containers in the stack of tiers of plastic containers must be unloaded from the stack in order to use the containers. Examples of pallet unloading apparatus teachings are found in the United States patents:

U.S. Pat. No. 4,231,697 ('697) to Franz issued Nov. 4, 1980;

U.S. Pat. No. 4,493,599 ('599) to Hartness, et al issued Jan. 15, 1985;

U.S. Pat. No. 5,033,929 ('929) to Marti issued Jul. 23, 1991.

The Franz '697 patent teaches apparatus for removing each of a plurality of aligned plastic containers from a conveyor and positioning the containers in aligned rows on a platform in a stacked tier arrangement. Movable arms controllably secure each tier of containers and controllably remove the tier of containers from the stack of tiers. The apparatus taught in the '697 patent moves containers by pushing the containers with movable arms. Containers having medium to large size base may be easily moved but moving containers with small base in the manner taught by this patent is not practical because small base container is much more subject to being tipped over and one fallen container in a tier of containers may jeopardize movement of an entire tier of containers.

The Hartness et al '599 patent teaches apparatus for depalletizing tiers of articles, such as bottles or containers, for example, from a multi-tier stack of tiers carried on a pallet. The walls or sections of a four-wall clamp surround the containers forming the top tier of the multi-tier stack. The walls of the clamp move inwardly, applying pressure to the outer containers in the tier of containers, pressing the containers together, so as to clamp or grip the containers defining the top tier. The top tier of containers is pressure secured and removed from the stack of tiers The integrity of the apparatus taught in the '599 patent depends on the efficiency of the pressure applied to the tier of containers. Should the pressure been too great, the containers will be crushed and the entire tier will be lost. Should the pressure be too little, the containers will not hold together and the entire tier will be lost. Further, the apparatus in the '599 teaching includes an elevator means that both elevates and lowers the containers handled by the apparatus. After the top tier is removed, the next tier in the stack of tiers is singularly elevated into a top tier position. The top tier is removed from the stack, cleared from the stack and lowered to a receiving table.

The Marti '929 patent teaches apparatus for unloading trays of bottles or containers stacked on a pallet. The stack of trays is positioned on an elevator means which elevates the stack of trays incrementally, so that the top tray of the stack is raised into a work position. A device having a gripper arrangement secures the top tray in the stack. The top tray is gripped by the gripper means and inverted, dumping the contents of the top tray into a hopper. The apparatus in the Marti '929 teaching requires that the contents of each tier be arranged in trays or at least on a tier sheet with some vertical siding or walling defining the ends of the support sheet. Without supporting the containers in trays or on a sheet with walls or vertical extended siding defining the edge of the support sheet, a tier of containers could not be handled as Marti '929 teaches.

SUMMARY OF THE INVENTION

The present invention provides a receiving frame, which receives a stack of tiers of plastic bottles or plastic jars, plastic containers, preferably stacked on a pallet. The pallet serves as a carrier for the stack of tiers. The receiving frame preferably includes a sub-frame which includes a tilting means and an elevator means. The stack of tiers is received by the sub-frame, within the receiving frame. The sub-frame is tilted backwards, tilting the stack of tiers so that the stack of tiers lays against the rear wall of the sub-frame. The elevator or lift means associated with the sub-frame incrementally elevates or lifts the stack of tiers so that the bases of the containers retained in the top tier in the stack are at least at the level of the top of the rear wall of the sub-frame, which is essentially the top of the receiving frame. When the sub-frame and the stack are thus positioned, that is, tilted approximately 30 degrees rearwardly and the top tier lifted so that the base of the containers in the top tier, that are adjacent the rear wall, are substantially at the level of the top of the rear wall of the sub-frame, the plastic containers in the top tier are on the inclined surface of the tier sheet and, when free, will fall freely from the stack.

After the stack of tiers of plastic containers are loaded into the receiving frame, the sheet cover and/or the bands securing the stack of tiers are removed. The sub-fame, including the elevator platform and the pallet and stack of tiers supported on the elevator platform, are tilted off vertical, so that the stack of tiers rests against the rear wall of-the tilted sub-frame. The elevator platform is then incrementally elevated to a level so that the base of the plastic containers in the top tier and adjacent the rear wall are substantially at the same level as the top of the rear wall. Since the sub-frame is tilted, the containers in the tiers are supported on the inclined surfaces of the respective tier sheets, inclined toward the rear wall. Because of the position and orientation of the containers in the top tier, with respect to the rear wall, the containers are urged toward the top of the rear wall, for free-fall over the rear wall. However, the containers in the top tier are contained by the top cover sheet covering the top tier. In order to release the plastic containers for the free-fall over the top of the rear wall, a sheet removal means is provided to remove the top sheet in the stack of tiers.

With the top cover sheet removed, the plastic containers in the top tier fall freely, under the force of gravity over the top of the rear wall, urged by other containers in the tier sliding down the inclined surface of the supporting tier sheet. After all the plastic containers in the top tier slide off the support sheet, the stack is incrementally elevated and the tier sheet, which supported the unloaded tier of containers, is removed from the stack by the sheet removal means. The sheet removal means secures the then top cover sheet and removes the sheet to a position clear of the free-falling containers.

The sub-frame, which may be incorporated into the receiving frame, if desired, preferably includes a rear or back wall, having a surface as opposed to a frame wall, and side walls, with an open front and open top. The platform on which the receiving frame is mounted forms a base for the sub-frame. The pallet supporting the stack of tiers, is moved into the receiving frame, so that the pallet and stack of tiers are on and/or supported by the lift platform of the elevator. The tilting means, which may be a two way hydraulic cylinder or motor driven gears, for example, tilts or pivots, the sub-frame at the base thereof, so as to incline the rear wall of the sub-frame approximately thirty (30) degrees off the vertical, out the rear of the receiving frame, so that the side of the stack adjacent the rear wall of the sub-frame rests against the rear wall, causing all the tier sheet in the stack to be in an inclined orientation. With the tier sheets of the stack so oriented, the containers supported by respective tier sheets are urged toward the rear wall of the sub-frame, but the rear wall contains the containers. When a tier of containers is elevated so that the containers adjacent the rear wall are no longer contained by the wall, the containers in the tier are urged toward, and over the rear wall, by the force of gravity. When the top cover is removed from the top tier, the containers in the top tier are freed to free-fall over the top of the rear wall and thus be unloaded from the top tier of the stack Preferably, the stack of tiers is incrementally lifted or elevated up the rear wall of the sub-frame, by the elevator means, until the bases of the containers, that are adjacent the rear wall and in the top tier, are at or slightly above the top of the rear wall. When the top cover of the tier is removed, the containers are free to free-fall over the top of the rear wall of the sub-frame.

After the top tier of containers, in the stack of tiers are unloaded by free-fall from the tier sheet supporting the containers, the stack is incrementally elevated so that the new top tier of containers, which are adjacent the rear wall, are positioned with the bases of the containers at or above the top of the rear wall of the sub-frame. The tier sheet, which had supported the unloaded tier of containers, is removed from the top of the containers in the top tier, by the sheet removal means, and the containers in the top tier are then free to slide down the inclined support sheet to free-fall from the top of the stack into a bin or hopper, for example.

When the plastic containers in the last or bottom tier in the stack are unloaded from the stack, a sensor means senses the position of the lift platform of the elevator means and sends a signal to the sheet removal means, which has accumulated and retained the cover and/or tier sheets removed from the stack of tiers. The sheet removal means returns to a position over the lift platform and releases the retained tier sheets on to the lift platform, or on to the pallet supported by the lift platform. The elevator means descends to the base of the sub-frame. At the same time, the tilt means repositions the sub-frame to a full up-right position and the pallet, with cover and/or tier sheets are removed from the receiving frame.

The steps of the operation may be changed, if desired, so that the sheet removal means removes the tier sheet or top sheet from the stack before the elevator increments the stack up the rear wall of the sub-frame. The tilting phase of the operation may be before, during or after the full stack has been elevated. This is a matter of choice. Preferably, a slide guide is provided, which may be adjustable, so that the free-falling containers may be controlled in direction or destination, during unloading. The slide guide may be in the form of a sluice, if desired. The platform or base of the pallet unloading apparatus may be rested on wheels or skids, for example, for maneuverability. The receiving frame may include devices for cutting and removing retaining bands or strans and/or sheeting used for stabilizing and/or covering the stack of tiers on the pallet.

BRIEF DESCRIPTION OF THE DRAWINGS

FIG. 3 is a representation of the invention shown in FIG. 1 with the top sheet in the stack removed;

FIG. 4 is a representation of the invention shown in FIG. 1 with the top tier of the stack elevated in free-fall position;

FIG. 5 is a representation of the invention shown in FIG. 1 with the last or bottom tier of containers, in the stack of containers dumped from the stack;

FIG. 6 is a representation of the invention shown in FIG. 1 with the tier sheet returned to the base of the elevator means; and, FIG. 7 is a representation of the invention shown in FIG. 1 with the elevator base returned to load-unload position.

DETAILED DESCRIPTION OF THE INVENTION

Figure 1:
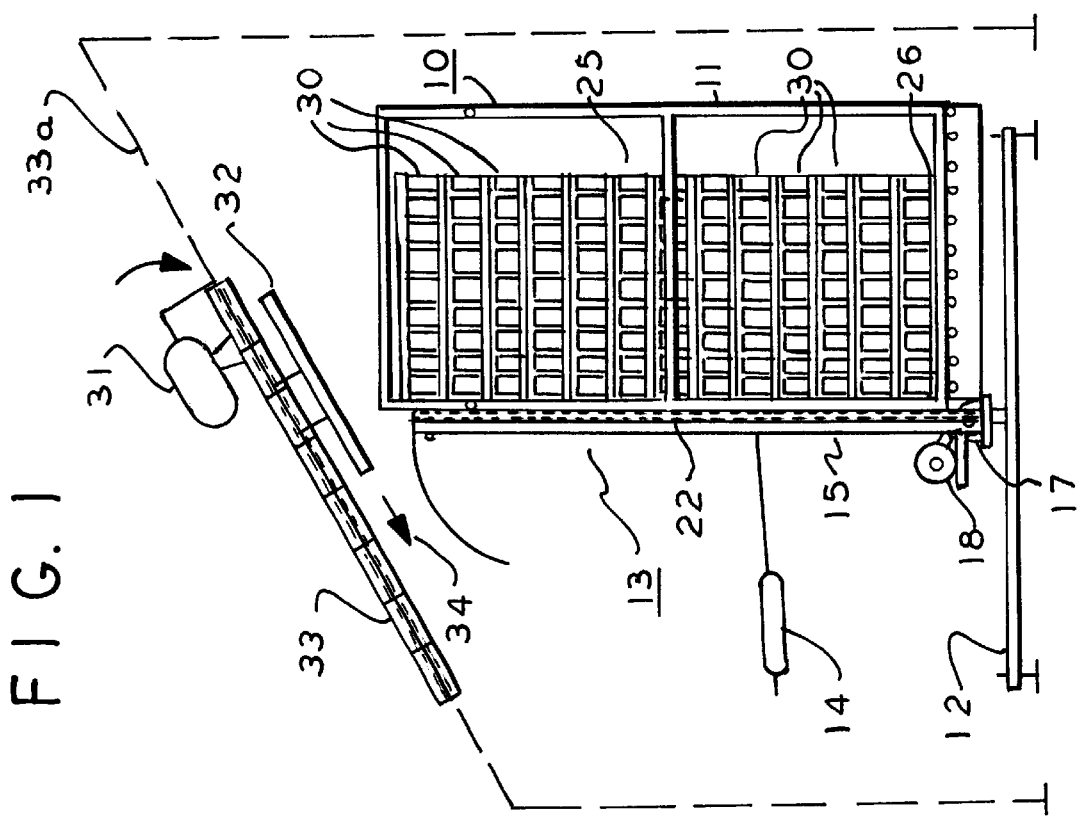
FIG. 1 is a representation of the invention, in side elevation view with a stack of tiers of containers in the receiving frame.
Figure 7:
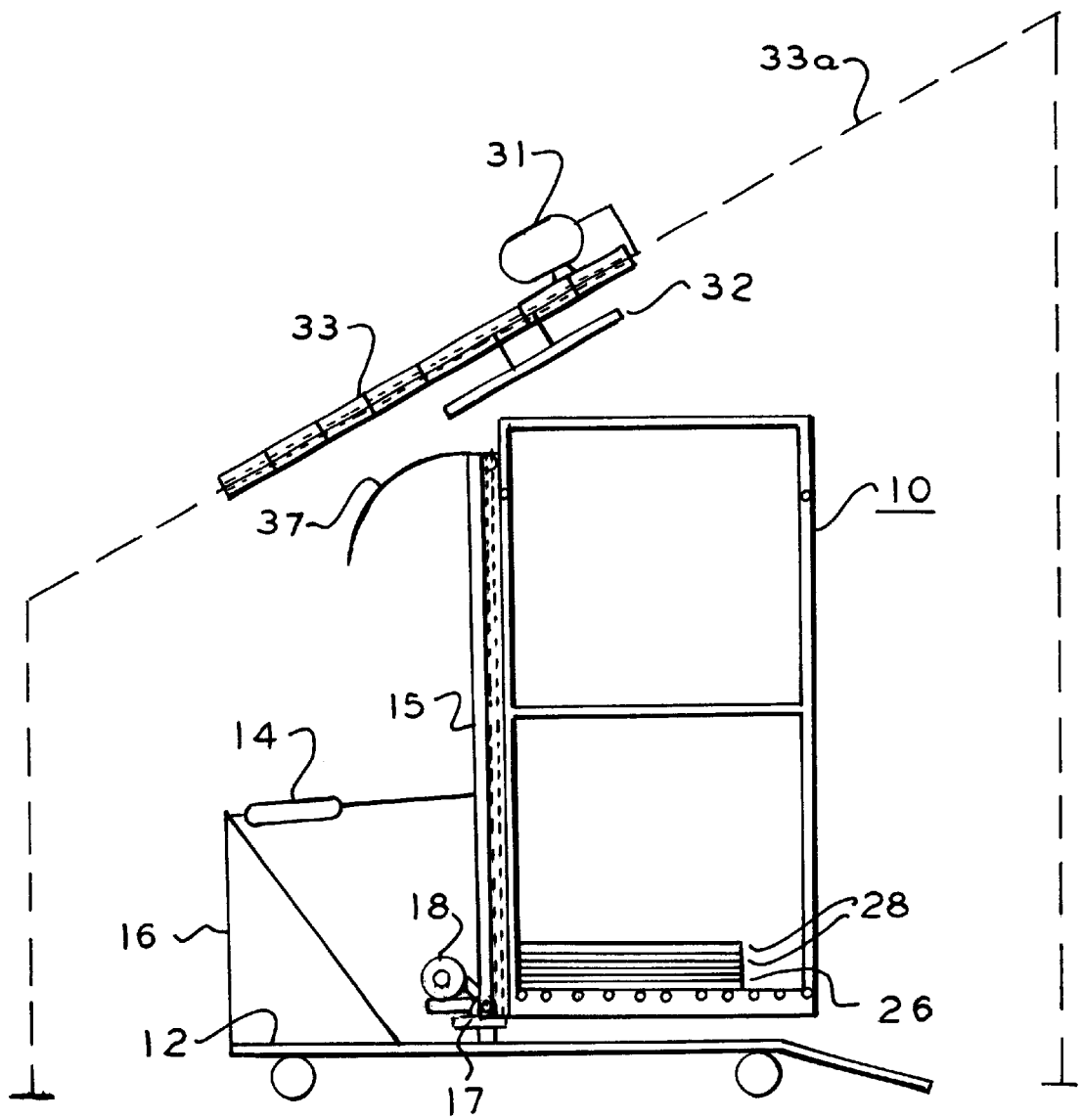

For purposes of clarity and comprehension, throughout the drawings and the description referenced to the drawings, identical components and/or elements represented in the drawings are identified with identical call-out numbers. FIG. 1 represents the invention with a stack of tiers of empty plastic containers positioned in the invention. A receiving frame 10 is mounted on a platform or stand 12. The platform 12 may be mounted on wheels or skids, or stand on feet which are adjustable so that the invention stands level on the floor. The receiving frame includes vertical side elements 11 mounted on the platform 12. The side elements may be solid wall sides or open frame sides. A sub-frame 13 is supported within the receiving frame and includes a pivot means 17 at or near the base of the rear wall 15 of the sub-frame. The upper arm of the pivot means, which defines the rear wall 15 of the sub-frame, tilts, off the vertical, out the open back of the receiving frame. A two way hydraulic piston in a cylinder means 14 is coupled between the rear wall 15 and an anchor means 16 for driving the rear wall between a vertical position and a tilt position. The anchor means 16 and the lower pivot arm are both connected to the platform, 12, as represented in FIG. 7.

The sub-frame includes an elevator or lift means which includes a motor 18, a base platform or lift platform 20, a lift chain 22 and idlers (not shown). The motor 18 operates in both forward and reverse modes so that the lift means may raise and lower the lift platform.

In practicing the invention, a stack of tiers of empty plastic containers, supported on a pallet, is moved into the receiving frame, 10. The pallet, supporting the stack, is positioned on the lift platform 20 of the elevator means. The cover sheet and/or straps or bands, used for covering and/or stabilizing the stack are removed from the stack. FIG. 1 represents the invention with a stack of tiers 25 of empty plastic containers 30, supported on a pallet 26, positioned in the receiving frame 10. The stack of tiers of empty plastic containers includes a plurality of tier sheets 28, each supporting a plurality of aligned plastic containers 30.

Above the receiving frame a reciprocating sheet gripping means 32 is provided. The sheet gripping means rides in a track 33 which is supported by a frame 33a shown in long-short dash lines. The track 33 is inclined at an angle to the horizontal so that the sheet gripping means will be essentially parallel with the upper surface of the tier sheets on the stack when the sub-frame and stack of tiers therein are tilted in full angular position. A motor drive 31 drives a chain which moves the sheet gripping means forward and back.

The FIGS. 1–7 represent the invention in progressive stages of a cycle of operation. A stack of tiers supported on a pallet is loaded and/or positioned in the receiving frame of the invention, FIG. 1. When loading the stack of tiers into the receiving frame, the sub-frame is positioned vertically up-right in the receiving frame and the sheet gripping means is positioned in the most forward position in the gripper means track. With the invention in the attitude represented in FIGS. 1 and 7, the invention may be loaded and/or unloaded.

Figure 2:
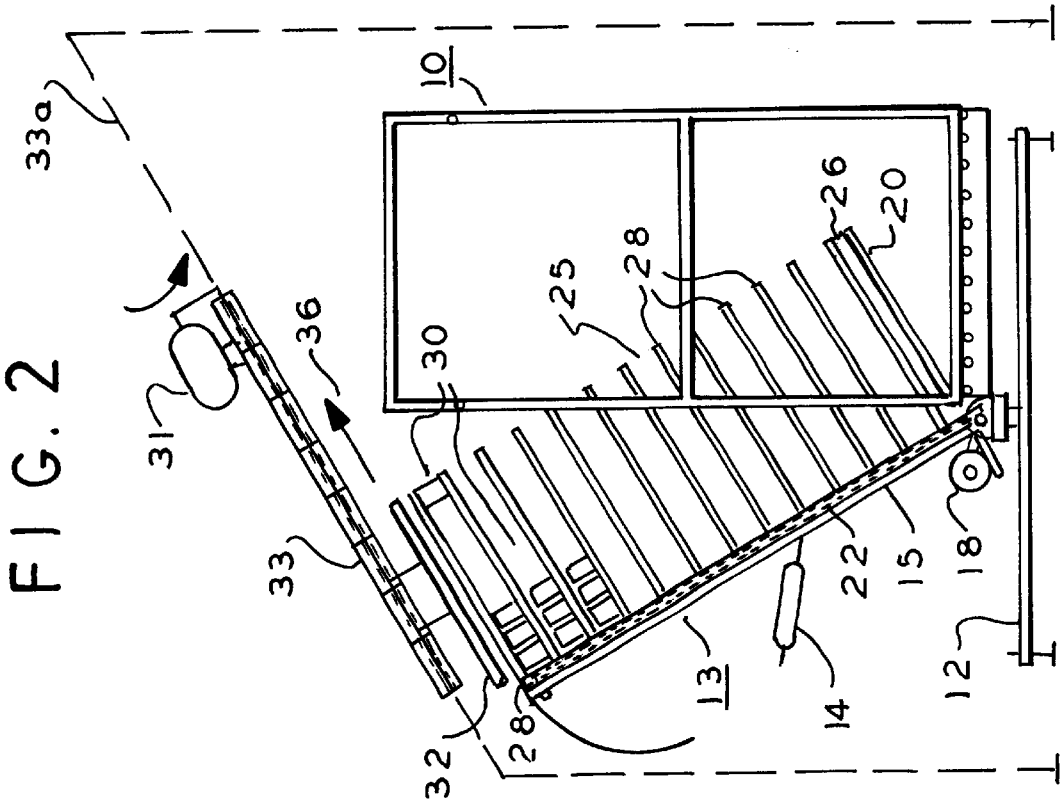
FIG. 2 is a representation of the invention shown in FIG. 1 with the sub-frame tilted.

With a stack of tiers 25 loaded in the receiving frame, the rear wall 15 is tilted rearwardly by actuation of the two way piston 14. The rear wall, pivots out the open rear of the receiving frame at the pivot means 17. When the rear wall tilts, the elevator means, including the lift platform and the stack of tiers supported on the lift platform are carried with the rear wall. As the stack of tiers of plastic containers is tilted, the stack, being unstable, shifts, the side of the stack adjacent the rear wall rests against the rear wall of the sub-frame. The sheet gripper means is positioned along the gripper means track, in the direction of the arrow 34, (FIG. 1), so that the sheet gripper means is oriented over the stack of tiers in order to grasp the upper most cover sheet or support sheet on the stack of tiers, (FIG. 2). The upper most support or cover sheet is grasped by the sheet gripper means and removed, in the direction of the arrow 36 (FIG. 2) so that the top tier of plastic containers are not contained from above, FIG. 3.

The elevator or lift means is operated to incrementally lift the stack of tiers up the inclined rear wall of the sub-frame so that the bases of the containers in the top tier, adjacent the rear wall of the sub-frame, are at substantially the same level as the top of the rear wall of the sub-frame. This permits the plastic containers in the top tier to slide down the inclined tier sheet, which supports the containers in the top tier and free-fall, from the stack, over the rear wall of the sub-frame. The plastic containers in the top tier are unloaded from the stack of tiers, in free-fall release (FIG. 4).

After all the containers in the top tier are unloaded from the tier, the elevator means is actuated to incrementally raise the platform, and relocate the stack of tiers vertically, so that the base of the containers in the then top tier on the stack, adjacent the rear wall of the sub-frame, are at the level of the top of the rear wall of the sub-frame. The sheet gripper means is relocated along the sheet gripper track so as to grip the top cover sheet and remove such sheet from the stack.

As represented in FIG. 5, the cycle of operation is repeated until all the tiers of containers have been unloaded from the stack. As represented, the sheet gripper means accumulates a plurality of cover and/or tier sheets which, after the containers in the stack are unloaded, are returned to the pallet on the lift platform, (FIG. 6). The sub-frame is tilted forward, to a vertical up right position, and the elevator means is actuated to lower the lift platform with the pallet and sheets. The pallet and sheets may be removed from the receiving frame and a new stack of tiers of containers on a pallet may be loaded into the receiving frame.

If desired, the receiving frame and the sub-frame may be united into one structure. The side walls may be made movable, to provide access to the stack resting on the lift platform, if desired. The rear wall of the sub-frame is preferably a full sheet wall, as opposed to an open frame wall. The side wall of the sub-frame may be closed or open frame walls, as desired. A sensor means, such as a presence detector, for example, may be used to determine the level or position of a tier sheet for positioning the level of the bases of the containers adjacent the rear wall of the sub-fame. Preferably, the rear wall or the sub-frame is tilted substantially 30 degrees off-vertical. The tier sheets are oriented to 30 degrees above horizontal, providing an inclined surface that the containers in the top tier will slide down, under the force of gravity. Other degrees of tilt may be used, as desired. The degree of tilt used, when practicing the invention, depends on the size and number of plastic containers in a tier of the stack of tiers being unloaded.

When practicing the invention it will be apparent that, using a tilt of substantially 30 degrees, as proposed herein, an average tier of empty plastic containers may be unloaded from a stack of tiers in less than 2.5 seconds of time, starting from the time the containers are free to fall over the rear wall of the sub-frame. A time interval may be used to determine that the empty plastic containers comprising the tier have been unloaded. Alternatively, a sensor means, which detects the presence of a container on the tier sheet, for example, may be used to determine when all the containers in the tier have been unloaded from the tier sheet.

A slide guide, 37, (FIG. 4) extending from the top of the rear wall of the sub-frame may be provided in order to guide the plastic containers during free-fall. The slide guide may be adjustable and/or be in the from of a sluice, for example. The containers may be unloaded into a bin or hopper positioned near or adjacent the invention. The platform on which the receiving frame is mounted may include a set of skids or wheels, making the invention more mobile.

In the foregoing description of the invention, referenced to the drawings, certain terms have been used for conciseness, clarity and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented or described.

Having now described a preferred embodiment of the invention, in terms of features, discoveries and principles, along with certain alternative construction and suggested changes, other changes that may become apparent to those skilled in the art may be made, without departing from the scope of the invention defined in the appended claims.

What is claimed is:

1. Apparatus for unloading plastic containers from a stack of tiers of plastic containers contained on a pallet comprising:
    (a) a receiving frame mounted on a platform, said receiving frame having vertical side elements;
    (b) a sub-frame supported within said receiving frame, said sub-frame further comprising
        (i) a lift platform for receiving a pallet containing a stack of tiers of plastic containers;
        (ii) a vertical wall secured to said platform adjacent one end of said lift platform;
        (iii) rotational means for speedily detaching said vertical wall from said receiving frame and placing said vertical wall at an angle with respect to said receiving frame;
        (iv) lift means for raising and lowering said lift platform containing said stacks of ties;
    (c) a tier sheet removal means for securing a top tier from said stack of tiers, said tier sheet removal means being supported above said receiving frame and positioned parallel to said angle after said vertical wall been tilted by said rotational means, wherein, said tier sheet removal means detach said top tier sheet from said stack of tiers and free said containers contained by said top tier sheet.

2. The apparatus of claim 1, where said rotational means includes a two way hydraulic piston in a cylinder, where one end of said piston being secured to said vertical wall and the other end of said piston being secured to an anchor means.

3. The apparatus of claim 1, wherein said lift means includes means for incrementally raising said lift platform enabling said tier sheet removal means to successively remove tier sheets from the uppermost tier of plastic containers.

4. Apparatus as in claim 1 in which said tier sheet removal means includes a tier sheet gripper means for securing a top tier sheet removed from said stack of tiers of plastic containers.

5. Apparatus as in claim 4 in which said tier sheet removal means further includes a track, a chain drive and a drive means for driving said tier sheet gripper means in said track toward and away from said stack of tiers.

6. Apparatus as in claim 1 in which said vertical wall of said sub-frame defines a back wall of said receiving frame and said lift platform tilts when said vertical wall tilts.

7. Apparatus as in claim 1 in which said receiving platform includes a set of wheels mounted under said receiving platform.

8. Apparatus as in claim 1 which includes a slide guide connected to the upper end of said vertical wall for guiding said empty plastic containers in free-fall over the top of said vertical wall.

9. Apparatus as in claim 8 in which said slide guide is adjustable for guiding said plastic containers selectively.

* * * * *